United States Patent [19]

Casey

[11] Patent Number: 4,603,000

[45] Date of Patent: Jul. 29, 1986

[54] PROCESS AND APPARATUS FOR FLOCCULATING AND CLARIFYING A SOLID-LIQUID SLURRY

[75] Inventor: John A. Casey, San Francisco, Calif.

[73] Assignee: Fabcon Incorporated, San Francisco, Calif.

[21] Appl. No.: 647,822

[22] Filed: Sep. 5, 1984

[51] Int. Cl.[4] .............................................. B01D 21/01
[52] U.S. Cl. ..................................... 210/715; 127/13; 127/57; 210/718; 210/738; 210/776; 210/109; 210/112; 210/188; 210/207; 210/519; 210/525
[58] Field of Search ...................... 127/13, 14, 55, 57; 210/715, 738, 776, 199, 205, 207, 208, 519, 525, 537, 540, 104, 109, 112, 718, 188, 218

[56] References Cited

U.S. PATENT DOCUMENTS

| | | | |
|---|---|---|---|
| 2,643,976 | 6/1953 | Sebald | 210/197 |
| 2,679,464 | 5/1954 | Moore | 127/50 |
| 2,728,694 | 12/1955 | Swanson | 127/57 |
| 3,403,096 | 9/1968 | Mackrle et al. | 210/715 |
| 3,481,868 | 12/1969 | Gilwood et al. | 210/715 |
| 3,523,889 | 8/1970 | Eis | 210/715 |
| 3,963,513 | 6/1976 | Casey | 127/11 |
| 4,038,185 | 7/1977 | Kline | 210/519 |
| 4,135,946 | 1/1979 | Casey et al. | 127/11 |
| 4,274,958 | 6/1981 | Fitch | 210/519 |
| 4,279,747 | 7/1981 | Chen | 210/197 |
| 4,390,429 | 6/1983 | Lejeune et al. | 210/519 |

Primary Examiner—Peter Hruskoci
Attorney, Agent, or Firm—Wenderoth, Lind & Ponack

[57] ABSTRACT

A solid-liquid slurry, particularly sugar juice, is flocculated and clarified in an arrangement including a clarifier tank containing therein a mud bed of concentrated removed solids. A preflocculating vessel extends into the top of the clarifier tank and includes upper and lower chambers. The slurry is introduced into the upper chamber to flow turbulently therein, thereby deaerating the slurry. The slurry is transferred from the upper chamber to the lower chamber while the turbulent flow of the slurry is changed to a laminar flow. A flocculating agent, for example a suitable polymer, is introduced into the slurry, such that solids of the slurry coagulate as flocs in the lower chamber. The thus preflocculated slurry is introduced directly into the clarifier tank at a level beneath the surface of the mud bed therein. The liquid of the slurry percolates upwardly through the mud bed and is filtered, thus forming clarified liquid, and the flocs of solids settle downwardly into and form the mud bed. The clarified liquid is removed from the upper portion of the clarifier tank.

25 Claims, 2 Drawing Figures

PROCESS AND APPARATUS FOR FLOCCULATING AND CLARIFYING A SOLID-LIQUID SLURRY

BACKGROUND OF THE INVENTION

The present invention is directed to a process and apparatus for flocculating and clarifying a solid-liquid slurry by removing solids therefrom, thereby clarifying the liquid, while simultaneously concentrating insoluble solids to a relatively dense mud bed.

More specifically, the present invention is directed to such a process and apparatus whereby it is possible to simultaneously deaerate, preflocculate and clarify such a slurry.

While the present invention is suitable for the clarification of a wide range of solid-liquid slurries, the present invention is viewed as being particularly suitable for the clarification of sugar juices and other difficult to clarify slurries the particulate matter of which is difficult to flocculate and coagulate by conventional systems. Thus, the following discussion will be with reference to the deaeration, preflocculation and clarification of sugar juices, but it is to be understood that the concept of the present invention is not limited thereby and rather is applicable to other solid-liquid slurries as will be apparent to those skilled in the art.

Over the years, the clarification of sugar juices in the sugar industry continuously has been improved. Originally, sugar juices were clarified by adjusting the pH with lime to approximately neutral, heating to boiling and allowing to settle for several hours in gravity settling tanks. This however was a batch operation and was not continuous. The liming and heating increase the amount of insoluble solids and typically allow coagulation and precipitation thereof during extended settling of up to three to four hours. Disadvantages of this system are, in addition to the long required settling time and the lack of continuous operation, that the extended settling time allows acidification of the juice, and the varied quality of the sugar juice due to differences in geography, time, weather, etc. made clarification relatively unreliable and frequently result in a substandard product.

Improvement in equipment designs allowed continuous clarification of sugar juices by clarifiers with multiple trays allowing mud to settle on the individual trays, thereby incorporating several clarifiers into a single vessel. Nevertheless, the basic problems of extended clarification times of two to four hours remain, as do the problems associated with the wide variety of sugar juice quality.

With the advent of chemical polymers such as polyacrylamides it became possible to treat juices with small quantities of such polymers, thus accomplishing some flocculation and coagulation of juices and thereby improving the reliability of clarification in multi-tray clarifiers. Capacity also was increased, but the improvements were relatively marginal, with settling times rarely if ever being less than two hours.

The next development in the industry involved rapid clarifiers such as the Eis clarifier and the SRI (Sugar Research Institute) clarifier, wherein juices that had been limed and treated with a chemical polymer were introduced into a clarification vessel in such a manner that they entered below the mud level therein and flocculated particles were formed within the mud bed. The liquor or liquid was forced to rise through the mud bed, achieving a degree of filtration, and such liquid then was removed from an upper clarified liquid level. Such clarifiers offer rapid clarification with retention times on the order of 30 minutes. However, the operating sensitivity and the variation of sugar juice quality internationally have restricted general acceptance of such clarifiers. Another development in the industry involves a preflocculating apparatus, such as disclosed in U.S. Pat. Nos. 3,963,513 and 4,135,946. In this type of apparatus, sugar juices are limed, deaerated and pretreated with polymer in a preflocculating chamber wherein the juices are literally rolled back onto themselves with the continuing application of fresh polymer, such that a "snowballing" effect causes a preflocculation of solids in the slurry. These flocs of solids are uniform in size and of greater density than in previous flocculation procedures. The thus preflocculated juice passed on to conventional multi-tray clarifiers exhibits qualities of more rapid settling and superior clarified juice purity and clarity. Further, such procedure requires less lime for pH control, this resulting from reduced acidification of the juice consistent with shorter settling times in the clarifier. Laboratory tests prove that such preflocculated juice will settle within minutes and when passed through conventional multi-tray clarifiers, capacity improvements are typically 20 to 40%, i.e. a reduction in required settling time from two to three hours to one to two hours. However, a marked disadvantage of preflocculation of slurries in equipment physically separate from the clarifier is the disruption and breakage of flocs of solids during transit from the preflocculating apparatus to the clarifier. Despite the best attention to laminar flow and minimum circuits, such disruption takes place inevitably and results in loss of efficiency during clarification.

SUMMARY OF THE INVENTION

With the above discussion in mind, it is an object of the present invention to provide a process and apparatus for the flocculation and clarification of a solid-liquid slurry, particularly sugar juices, whereby it is possible to overcome the above and other prior art disadvantages.

It is a further object of the present invention to provide such a process and apparatus whereby it is possible to avoid disruption and breakage of flocs of solids by introducing the preflocculated slurry directly into a clarifier, at a level beneath the surface of a mud bed therein.

It is a further object of the present invention to provide such a process and apparatus for the clarification of sugar juices whereby it is possible to provide improved results over known systems with respect to purity, pH drop, rate of inversion and percent CaO.

It is a yet further object of the present invention to provide such a process and apparatus whereby it is possible to clarify a wide variety of slurry inputs, such as filtrate juices, syrup scums from other clarifiers and new entering sugar juice itself, such complexity of liquid-solid slurries being homogenized during preflocculation, with the result that the floc particles will be of uniform size and above average density.

These objects are achieved in accordance with the present invention by providing a preflocculating vessel extending into the top of a clarifier tank having therein a mud bed of concentrated removed solids. The preflocculating vessel includes an upper chamber and a lower chamber. Slurry is introduced into the upper chamber, preferably tangentially, to flow turbulently therein. This turbulent flow deaerates the sugar juice, with air being discharged through a stack. The slurry of sugar juice then is transferred from the upper chamber to the lower chamber while the turbulent flow of the slurry is changed to a laminar flow. Specifically, the slurry passes through a downwardly converging conical portion of the upper chamber and passes through a vertical pipe and into the bottom of the lower chamber. A flocculating agent, for example a high molecular anionic polymer, is added to the slurry as it passes downwardly through the vertical pipe, such that the solids of the slurry coagulate as flocs in the lower chamber. The slurry passes upwardly through the lower chamber during the formation of the flocs. The thus preflocculated slurry passes over an upper edge of the lower chamber and then passes downwardly through an annular passage surrounding the lower chamber and is introduced directly into the clarifier tank at a level beneath the surface of the mud bed. The liquid then percolates upwardly through the mud bed and is filtered thereby, thus forming clarified liquid. The flocs of solids settle downwardly into and form the mud bed. The clarified liquid is removed from an upper portion of the clarifier tank, while the settled solids of the mud bed are concentrated and compacted and are selectively removed from the bottom of the clarifier tank, thereby controlling the level of the mud bed.

Thus, in accordance with the present invention, the concepts of preflocculation are combined with those of rapid clarification to take best advantage of the qualities of uniformly sized dense flocs available from preflocculation. Advantage also is taken of the concept that such flocs will form a heavier more stable mud zone, such that a clarifier embodying the dual qualities of continuous preflocculation and upward filtration of juices through a stable heavy mud zone may be operated at high capacity rates under more stable and reliable conditions than has been possible to date. These advantages enable the present invention to be practiced commercially on a broad international level while accepting the widest variation in slurry quality and allowing operation by operators with a minimum of technical skill and instruments to sustain production of high quality clarified juices at high rates of flow, without the danger of sudden disruption of mud levels resulting in rapid contamination of the juice and unacceptable performance.

BRIEF DESCRIPTION OF THE DRAWINGS

Other objects, features and advantages of the present invention will be discussed below, with reference to the accompanying drawings, wherein.

DETAILED DESCRIPTION OF THE INVENTION

Figure 1:
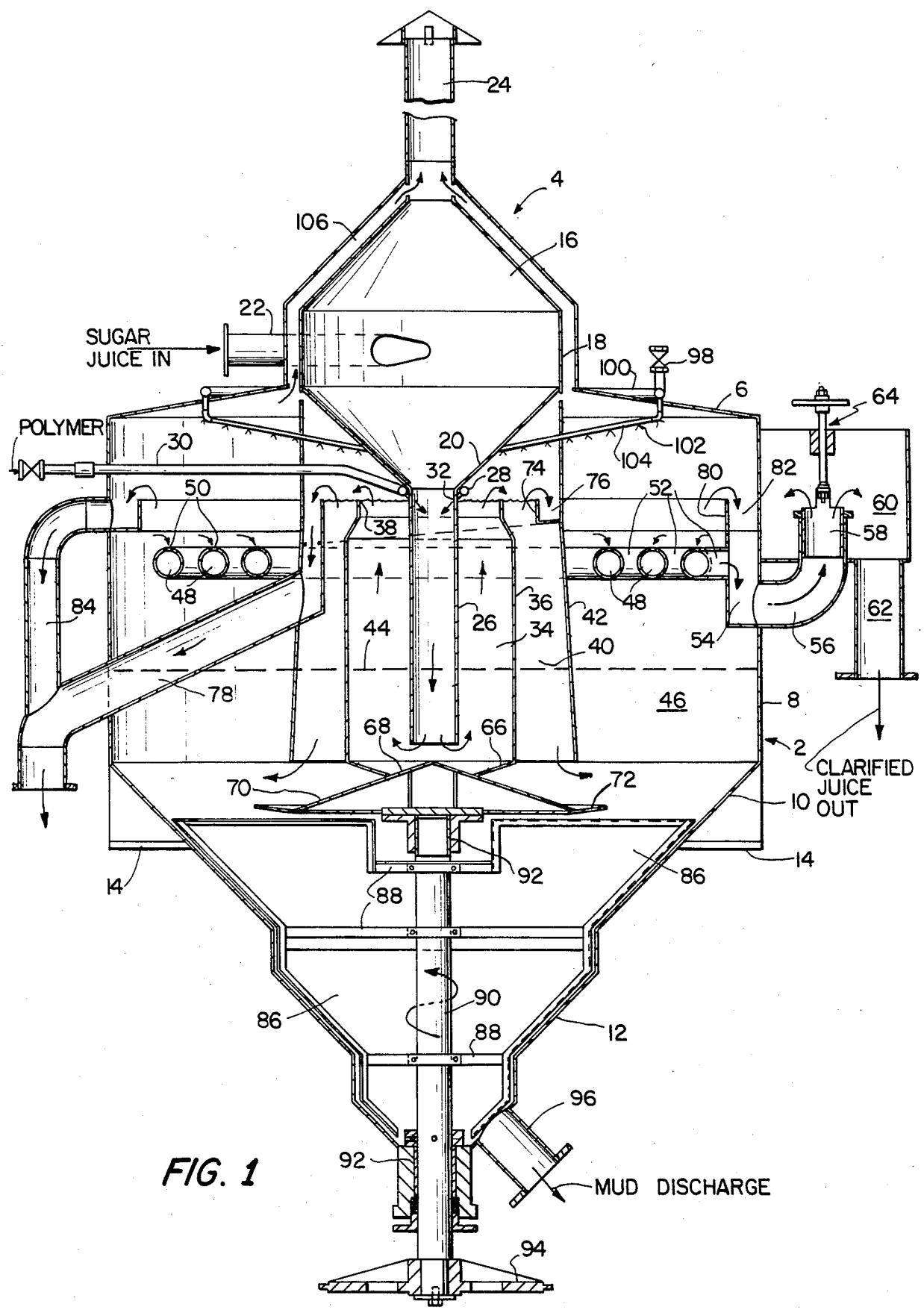
FIG. 1 is a vertical cross sectional view through an apparatus according to the present invention.
Figure 2:
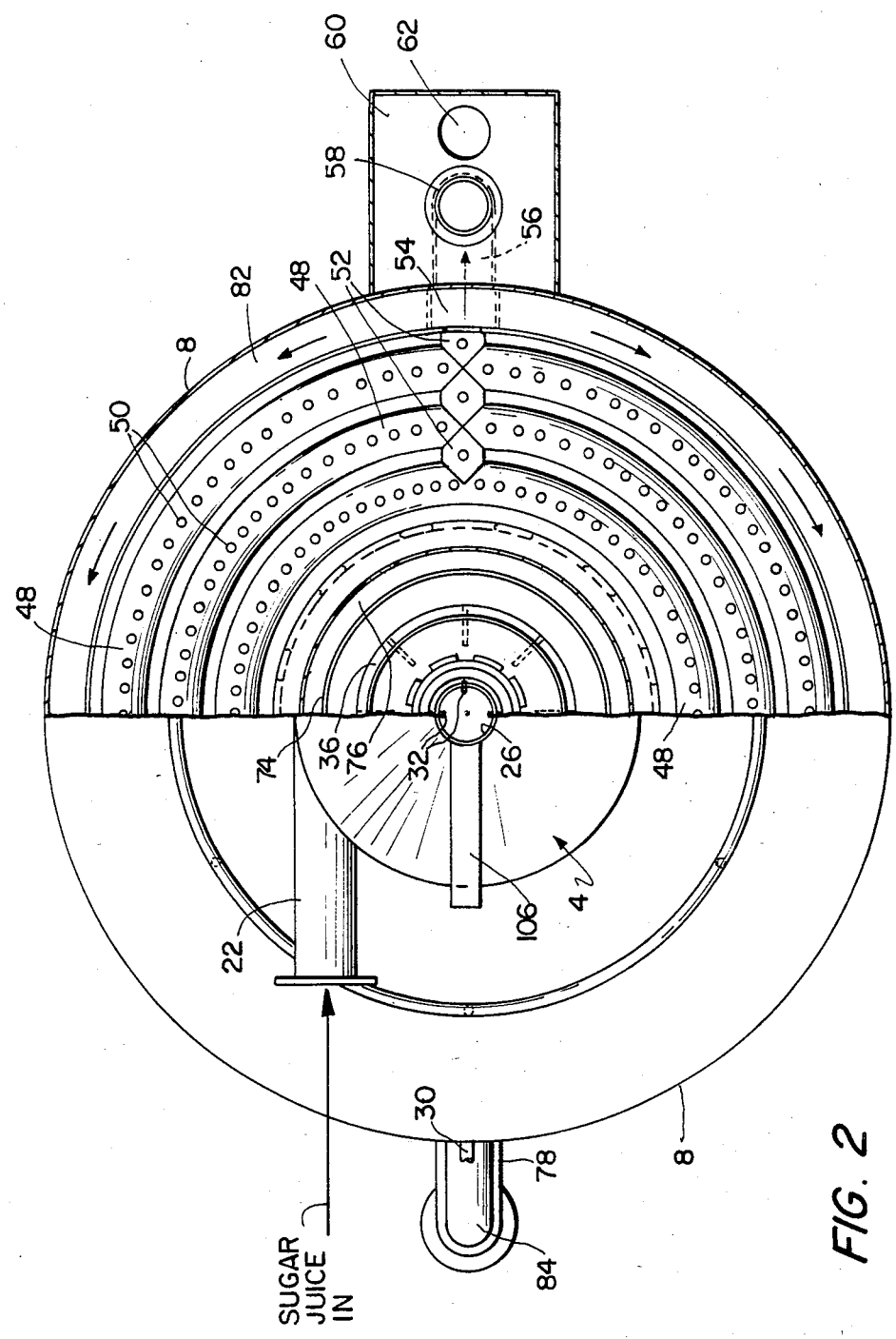
FIG. 2 is a top view thereof, the lefthand portion being shown in plan, and the righthand portion being shown in horizontal cross section.

An apparatus according to the present invention and illustrating the process of the present invention is shown in FIGS. 1 and 2. The apparatus includes a clarifier tank 2 and a preflocculating vessel 4 extending coaxially centrally into tank 2 through a top 6 thereof. Tank 2 includes a cylindrical main portion 8 and a bottom portion defined by successive downwardly converging conical portions 10, 12. The clarifier tank 2 is adapted to be mounted in a conventional manner, for example by support brackets 14.

The preflocculating vessel includes an upper chamber 16 defined by a cylindrical member 18 and a downwardly converging conical member 20. An inlet pipe 22 opens tangentially into upper chamber 16 for the supply thereto of a solid-liquid slurry. In the present invention, this slurry particularly is contemplated as being in the form of a sugar juice provided with lime for pH control. Supplying the juice tangentially into chamber 16 causes the juice to flow turbulently therein, for example by whirling as is cascades downwardly. This liberates incondensable gases in the juice to a stack 24 extending upwardly from chamber 16 in a known manner.

Extending from a bottom opening in conical member 20 is a vertical pipe 26. As the juice enters pipe 26 the turbulent flow of the juice gradually changes to laminar flow. Positioned annularly around pipe 26, for example at the upper portion thereof as shown in FIG. 1, is a conduit 28 connected to a supply line 30 for supply of a suitable flocculating agent, for example a polymer material, as will be understood by those skilled in the art. Conduit 28 has extending inwardly and downwardly through pipe 26 a plurality of nozzles 32 for directing the polymer into the juice slurry passing downwardly through pipe 26. This causes the solids of the slurry to coagulate as flocs.

The pipe 26 discharges through the bottom end thereof the slurry into the lower portion of a lower chamber 34 defined by an inner cylindrical member 36. The slurry passes from the bottom of pipe 26 into the chamber 34 and passes upwardly therethrough during formation of the coagulated flocs of solid material, in the manner indicated by the arrows in FIG. 1. During passage through chamber 34 the slurry thus becomes preflocculated, and this preflocculated slurry overflows over the upper end 38 of cylindrical member 36 and passes downwardly through an annular passage 40 defined around member 36 by means of an outer cylindrical member 42 which has a downwardly diverging configuration and which has an open lower end.

Thus, the preflocculated slurry is introduced directly into the clarifier tank 2 at a level beneath the surface 44 of the mud bed 46 therein. The liquid or juice of the slurry thus percolates upwardly through mud bed 46 and is filtered thereby, thus forming a clarified liquid or juice. The flocs of solids settle downwardly into and form the mud bed 46.

At the upper portion of a clarified liquid zone above the mud bed 46 are provided a plurality of concentric annular toric-shaped clarified liquid collecting tubes 48. The tubes 48 have in upper portions thereof annularly spaced orifices or openings 50 for the passage therethrough into the interiors of tubes 48 of the clarified liquid. The tubes 48 are connected by a radial tube arrangement 52 which is connected to a clarified liquid or juice collector 54 which is connected to a collecting elbow 56. The liquid flows through elements 54 and 56 and overflows through an upper end thereof or through an upper end of an adjusting sleeve 58 positioned therein and into a collecting chamber 60. Clarified liquid is discharged from chamber 60 through a discharge outlet 62. Sleeve 58 is vertically adjustable by means of an arrangement 64 whereby it is possible to adjust the vertical height of sleeve 58, thereby changing the upper level of the clarified liquid within the clarified liquid zone above the mud bed 46 in clarifier tank 2.

At the bottom of lower chamber 34 is provided an inwardly converging frusto-conical first surface 66 extending downwardly from the bottom of cylindrical member or body 36 and an inwardly converging conical second surface 68 extending upwardly from first surface 66 toward but spaced from pipe 26. Thus, the slurry supplied downwardly through pipe 26 is deflected outwardly and upwardly into and through the lower chamber 34 by means of surfaces 66, 68. At this time, there is imparted a rolling action to the flocs of solid material being formed in the slurry. This achieves the very desirable feature of forming the flocs into a more dense structure, the flocs being more uniform in size than in previous arrangements.

In a similar manner, at the bottom of annular passage 40 there is provided an outwardly and downwardly diverging annular surface 70 having an upwardly flared annular outer edge portion 72. Thereby, the preflocculated slurry passing downwardly through the open lower end of annular passage 40 is deflected outwardly and somewhat upwardly into mud bed 46.

Additionally, at the top of lower chamber 34 there is provided an arrangement for removing debris from the preflocculated slurry. Thus, as the preflocculated slurry overflows over the upper edge 38 of inner annular member 36 and passes downwardly into the annular passage 40, debris floating on the preflocculated slurry overflows a weir 74 having a serrated upper edge and into an annular channel 76. The debris is collected in channel 76 and passes therefrom by gravity into a discharge pipe 78, for example to a screen whereat solid particles are separated and any liquid juice is returned to the sugar juice supply.

Similarly, at the top of the clarified liquid zone in the clarifier tank there is provided an arrangement for removing scum or foam floating on the top of the clarified liquid. Thus, there is provided an overflow weir 80, and any foam or scum floating on the top of the clarified liquid overflows weir 80 into a collecting annular channel 82 by which the foam is passed via a conduit 84 to conduit 78, for similar treatment.

During settling of flocculated solids into mud bed 46, the mud bed 46 is concentrated and compacted due to the conical configuration of portions 10 and 12. Furthermore, a mud rake 86 is rotated at a slow speed, for example under 1 rpm. This slowly moving mud rake helps free solid particles from occluded juice and to compact the mud for ultimate discharge. Mud rake 86 may be of any conventional and known design. In the illustrated arrangement, mud rake 86 is in the form of vertical, radial members grazing the inner surfaces of the lower portion of the clarifier tank and supported by horizontal, radial arms 88 on a shaft 90 which is journaled, for example at bearings 92 and which is driven by a motor, for example via a gear 94.

The level of mud bed 46 within clarifier tank 2 is selectively controlled or adjusted in part by controlling the level of clarified juice, but primarily by discharge of mud through an outlet 96, for example by a suitable positive displacement pump.

The apparatus of the invention includes suitable means for washing of the internal portions of the apparatus, for example a water supply 98 connected to a manifold pipe 100 having connected thereto wash water supply pipes 102 having therein wash water supply orifices 104. The operation of such structure to achieve washing of the apparatus will be understood by those skilled in the art.

Furthermore, the flocculating vessel 4 has therein vent passages 106 to enable flashing or ventilation of gases from the interior of the apparatus, which otherwise essentially is closed. Such flashing or venting will be apparent to those skilled in the art from a consideration of the various arrows indicative thereof and shown in FIG. 1.

In accordance with a further feature of the present invention, perforations are provided through the plates forming surfaces 66 and 72, thereby allowing juices beneath such surfaces to rise through the mud concentration zone of the clarifier tank and to percolate through such surfaces for prompt exit as clarified juice.

In the preferred arrangement of the present invention discussed above, i.e. wherein the slurry is a sugar juice having added thereto lime for pH control, a diluted polymer as a coagulating agent is added through pipes 30, 28 and nozzles 32 to the slurry. Such polymer may be a high molecular weight anionic polymer, as will be understood by those skilled in the art. It is to be understood however that the present invention is applicable to the clarification of other solid-liquid slurries, and in such situations other coagulating agents may be employed. Furthermore, in such situations, one, two or three polymer applications may be appropriate. In such situations, the first polymer application may be at nozzles 32 as discussed above. A second polymer application may be in chamber 34, for example at a lower or upper portion thereof. A third polymer application may be at annular passage 40, for example at the upper or lower portion thereof. Such multiple polymer applications could be sequentially cationic, anionic and cationic, or whatever sequence of application is most appropriate to preflocculate the particular slurry involved.

In accordance with the present invention, the preflocculated slurry is introduced into the mud bed 46 at a level substantially midway between the clarified juice or liquid take off pipes 48 and the deflector surface 72. Thereby, the preflocculated slurry discharging into the mud bed 46 percolates through the mud bed and is filtered thereby.

In accordance with a further feature of the present invention, should concentration of the mud bed require supplemental polymer addition, provision may be made for application of such supplemental polymer in the concentrating portion defined by conical section 12 and/or conical section 10.

In accordance with the present invention, the flocs of solids formed will be heavier and more stable than in prior arrangements. The slurry introduced at inlet 22 is typically conditioned with chemicals, salts and lime to have a pH of approximately 7.0, and preferably not exceeding 7.2. The rolling swirling motion imparted by surfaces 66, 68 is of importance because it allows the insoluble and colloidal particles to be coagulated and flocculated in conjunction with continuing addition of polymer, such that the flocs grow into uniformly sized particles of greater density than otherwise would be formed.

As a result of the present invention, the total retention time of the juice within the system is 10 to 30 minutes, both for preflocculating and clarifying. As a result, the decrease in pH due to acidification is decreased to less than 0.2, typically approximately 0.1. In contrast, the pH drop due to acidification in conventional multi-tray clarifiers, wherein residence time is two to four hours, is 0.5 to 1.0. Confirmation of this decrease in pH drop is the fact that lime consumption necessary for treatment of sugar juice clarified in accordance with the present invention is approximately 0.5 to 0.65 pounds of lime per ton of cane, compared with conventional lime consumption of 0.9 to 1.1 pounds of lime per ton of cane. This greater lime consumption is required to offset the acidification of the sugar juice that takes place naturally through microbia and thermodegradation of the juice during extended retention time at elevated temperatures required in prior art arrangements.

In accordance with the present invention, it is possible to increase production, especially during expansion of an existing factory, without the need of installing an additional clarifier unit, and yet to produce better results than in standard clarifiers. It is possible in accordance with the present invention to treat equivalent tonnage with less clarifier volume because of increased juice flow rate. The greater capacity of the apparatus of the invention results in less retention time in the clarifier, and hence a smaller possibility of inversion losses.

Actual comparative tests between a pilot installation of the present invention and existing conventional clarifiers indicated a substantial reduction in retention time, a purity increase, a reduction in the rate of pH drop, a reduction in the rate of inversion, and improved percent CaO in accordance with the present invention, with comparable performance with reqard to other important parameters. Furthermore, no disruption or breakage of the floc particles occurred, unlike existing systems wherein preflocculated slurry from a preflocculator unit must be transported through pipes of varying lengths to a clarifier. Thus, since retention time is reduced substantially, the extent of pH drop across the clarifier is reduced. Lime consumption likewise is reduced, with a sharp increase in clarified juice purity due to a minimal sugar loss caused by inversion. This achieves an improved boiling house recovery. In accordance with the present invention, the insoluble inpurities are homogenized for a more efficient removal to provide a highly clarified juice with improved clarity.

Although the present invention has been described and illustrated with respect to preferred features thereof, it is to be understood that various modifications and changes may be made to the specifically described and illustrated features without departing from the scope of the present invention.

I claim:

1. An apparatus for flocculating and clarifying a solid-liquid slurry by removing solids therefrom, said apparatus comprising:
   a clarifier tank containing therein a mud bed of concentrated removed solids;
   a preflocculating vessel extending into said clarifier tank from the top thereof, said preflocculating vessel including an upper chamber and a lower chamber, said upper chamber including a cylindrical portion and a downwardly converging conical portion extending downwardly from said cylindrical portion;
   means for introducing slurry tangentially into said upper chamber and for causing said slurry to flow turbulently therein;
   means for transferring said slurrly from said upper chamber to said lower chamber and for changing the turbulent flow of said slurry to laminar flow thereof, said transferring means comprising a pipe extending downwardly from said conical portion into said lower chamber;
   means for introducing a flocculating agent into said slurry during passage thereof through said pipe, such that solids of said slurry coagulate as flocs in said lower chamber;
   said lower chamber comprising a first annular member spaced outwardly of said pipe and having an upper edge;
   means at the bottom of said lower chamber for deflecting said slurry supplied downwardly through said pipe outwardly and upwardly through said lower chamber inwardly of said first annular member, while imparting a rolling action to said flocs formed in said lower chamber such that said flocs grow into uniformly large sized particles of increased density, whereafter the thus preflocculated slurry overflows said upper edge of said first annular member;
   means for introducing said preflocculated slurry directly into said clarifier tank at a level beneath the surface of the mud bed therein, said preflocculated slurry introducing means comprising a second annular member positioned outwardly of said first annular member and defining therewith an annular passage having an open lower end at said level, means spaced below said annular passage for deflecting said preflocculated slurry outwardly and upwardly into said mud bed, said preflocculated slurry overflowing said upper edge and flowing downwardly into said annular passage, whereafter the liquid percolates upwardly through said mud bed and is filtered thereby, thus forming clarified liquid, and said flocs of solids settle downwardly into and form said mud bed; and
   means for removing said clarified liquid from said clarifier tank.

2. An apparatus as claimed in claim 1, wherein said deflecting means comprises an inwardly converging frusto-conical first surface extending downwardly from the bottom of said cylindrical body and an inwardly converging conical second surface extending upwardly from said first surface toward said pipe.

3. An apparatus as claimed in claim 1, wherein said second annular member diverges downwardly.

4. An apparatus as claimed in claim 1, wherein said deflecting means comprises an outwardly and downwardly diverging annular surface spaced below said annular passage, said surface having an upwardly flared annular outer edge portion.

5. An apparatus as claimed in claim 1, further comprising means, adjacent the top of said lower chamber, for removing debris from said preflocculated slurry.

6. An apparatus as claimed in claim 5, wherein said removing means comprises an overflow weir positioned to collect debris floating on said preflocculated slurry during the overflow thereof over said upper edge, and a channel for discharging said collected debris.

7. An apparatus as claimed in claim 6, wherein said weir is serrated.

8. An apparatus as claimed in claim 1, wherein said removing means comprises tubes positioned adjacent the top of a clarified liquid zone above said mud bed in said clarifier tank, said tubes having therein orifices through which flows the clarified liquid.

9. An apparatus as claimed in claim 8, wherein said orifices are in upper portions of said tubes, and further comprising a collector for collecting said clarified liquid from said tubes.

10. An apparatus as claimed in claim 9, wherein said collector includes means for adjusting the level of said clarified liquid in said zone.

11. An apparatus as claimed in claim 8, wherein said tubes comprise a plurality of concentric annular toric-shaped tubes.

12. An apparatus as claimed in claim 8, further comprising means at the top of said zone for removing scum or foam floating on the top of said clarified liquid.

13. An apparatus as claimed in claim 12, wherein said removing means comprises an overflow weir leading to a collecting channel.

14. An apparatus as claimed in claim 1, further comprising means for concentrating and compacting the settled solids forming said mud bed.

15. An apparatus as claimed in claim 14, wherein said compacting means comprises a downwardly converging conical lower portion of said clarifier tank.

16. An apparatus as claimed in claim 15, further comprising a mud rake mounted for slow rotation in said lower portion of said clarifier tank.

17. An apparatus as claimed in claim 15, further comprising outlet means at the bottom of said clarifier tank for selectively removing mud therefrom, and thereby for controlling the height of said mud bed.

18. A process for flocculating and clarifying a solid-liquid slurry by removing solids therefrom, said process comprising:
   providing a clarifier tank containing therein a mud bed of concentrated removed solids, and a preflocculating vessel extending into said clarifier tank from the top thereof and including upper and lower chambers;
   introducing a solid-liquid slurry tangentially into said upper chamber to flow turbulently therein;
   transferring said slurry from said upper chamber downwardly through a pipe and thereby changing the turbulent flow of said slurry to laminar flow;
   introducing a flocculating agent into said slurry during passage thereof through said pipe, such that solids of said slurry coagulate as flocs in said lower chamber;
   deflecting said slurry outwardly and inwardly into said lower chamber, thus imparting a rolling action to said flocs forming therein, such that said flocs grow into uniformly large sized particles of increased density;
   passing the thus preflocculated slurry upwardly through said lower chamber, outwardly over the top thereof and then downwardly through an annular passage surrounding said lower chamber;
   introducing said preflocculated slurry directly from said annular passage into said clarifier tank at a level beneath the surface of said mud bed, deflecting said preflocculated slurry outwardly and upwardly from the bottom of said annular passage into said mud bed, such that the liquid percolates upwardly through said mud bed and is filtered thereby, thus forming clarified liquid, and said flocs of solids settle downwardly into and form said mud bed; and
   removing said clarified liquid from said clarifier tank.

19. A process as claimed in claim 18, further comprising removing debris floating on said preflocculated slurry at the top of said lower chamber.

20. A process as claimed in claim 18, further comprising adjusting the level of said clarified liquid above said mud bed in said clarifier tank.

21. A process as claimed in claim 18, further comprising removing scum or foam floating on the top of said clarified liquid above said mud bed.

22. A process as claimed in claim 18, further comprising concentrating and compacting the settled solids forming said mud bed in said clarifier tank.

23. A process as claimed in claim 18, further comprising slowly rotating a mud rake in a lower portion of said mud bed in said clarifier tank.

24. A process as claimed in claim 18, further comprising selectively removing mud from the bottom of said clarifier tank, and thereby controlling the height of said mud bed.

25. A process as claimed in claim 18, wherein said slurry comprises sugar juice.

* * * * *